Patented Aug. 14, 1951

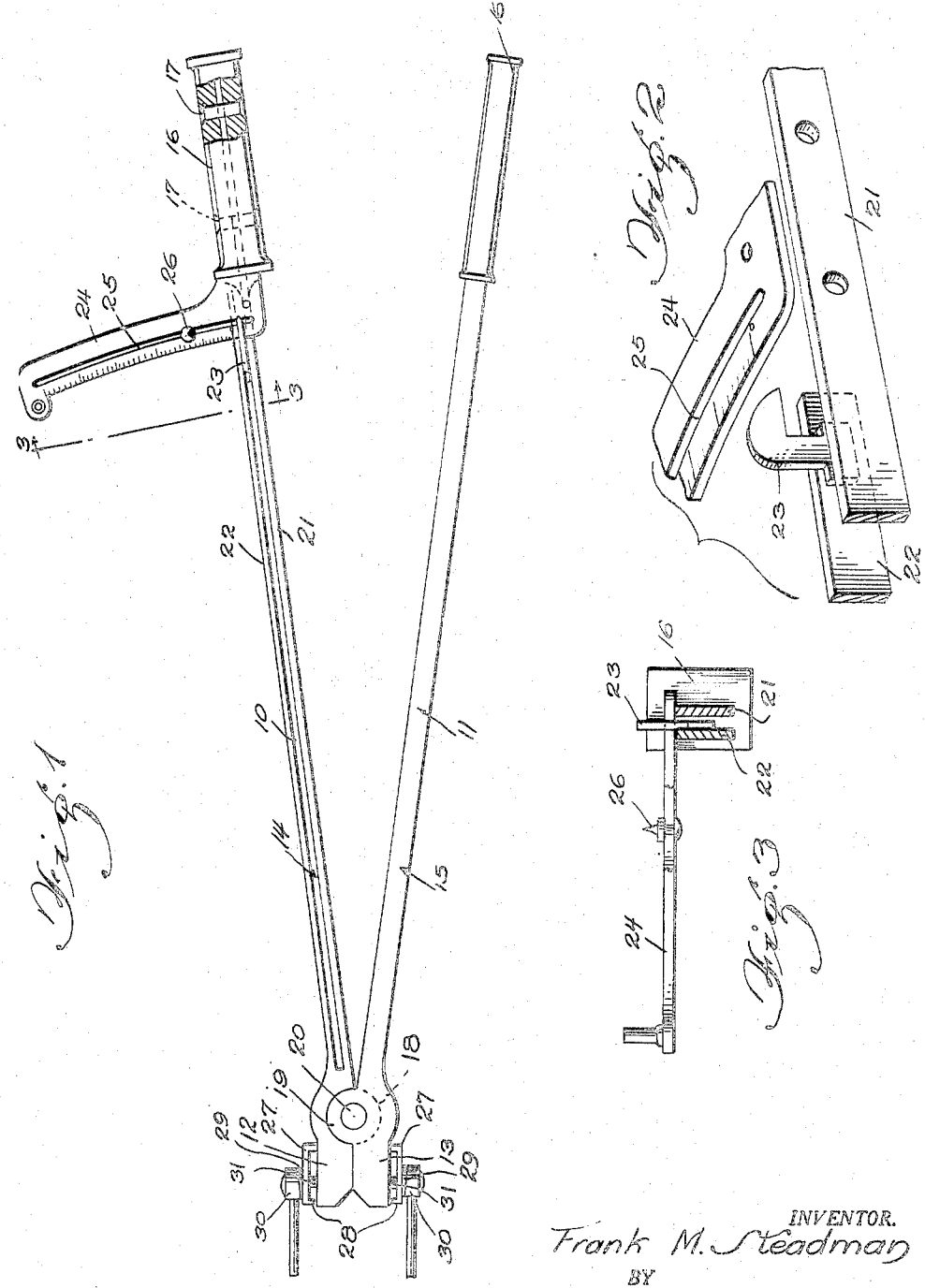

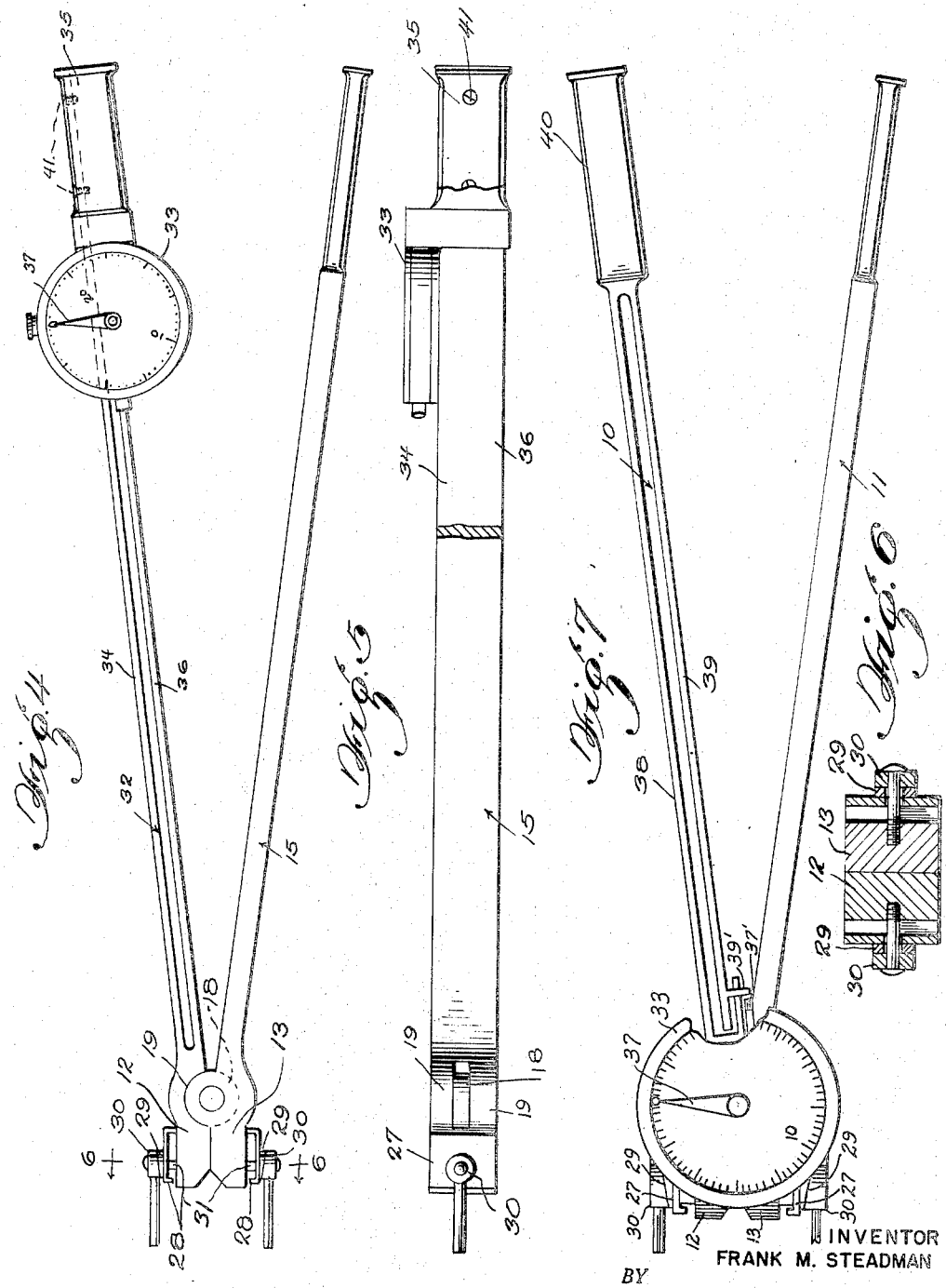

2,563,881

UNITED STATES PATENT OFFICE 2,563,881

TENSIOMETER

Frank M. Steadman, Philadelphia, Pa.

Application August 17, 1945, Serial No. 611,215

5 Claims. (Cl. 73—95)

(Granted under the act of March 3, 1883, as amended April 30, 1928; 370 O. G. 757)

My invention relates to instruments for testing the tensile strength of strips of textile fabric or individual threads and strands and more particularly to a hand operated instrument of this type which is of simplified and sturdy construction making it readily portable.

Heretofore, different types of tensiometers and other instruments for measuring the tensile strength of strips of fabric or of individual threads and strands have been constructed, but most of these instruments are relatively complicated and are designed to be permanently secured in place for use in indoor laboratories or similar places. Obviously such instruments are not portable and cannot be carried conveniently to the place where the materials to be tested are located, but rather the material must be brought to the instrument, which under certain circumstances may be inconvenient or impossible. Furthermore, the construction of many of these prior instruments is such that trained operators are required for their proper handling and they are subject to frequent maladjustment due to the presence of dust or foreign materials in the delicate operating mechanism, or due to corrosion of these parts or simply as a result of rough handling and of abuse of the instruments by careless operators.

In an effort to overcome these disadvantages, I have devised a hand operated tensiometer generally similar in construction to a pliers in that it has pivoted members formed to provide operating jaws to which a strip of material to be tested is clamped and which are spread when force is applied to the operating handles to apply a tension to the strip clamped between the jaws the amount of which is visually indicated on the tool through the operation of one of the operating arms of the tool this arm being constructed in the form of a torque measuring tool.

It is accordingly an object of my invention to provide a new and improved tensiometer which is sturdy in construction but light in weight, small in size and compact so that it is readily portable and may be carried by an operator from place to place.

Another object of my invention is the provision of a new and improved tensiometer constructed in the form of a pliers having jaws with means for clamping a strip of fabric or a strand of thread thereto and operating levers for opening the jaws to place the material being tested under tension, one of the latter levers being so constructed that it indicates the torque being applied thereto.

A further object of the invention is the provision of a new and improved tensiometer in which the need for racks, pinions, pivots, drawstrings and other delicate mechanism commonly found in tools of this class is obviated so that a tool of sturdier construction and greater ease of operation is provided.

A still further object of the invention is the provision of a new and improved tensiometer which can be constructed to indicate directly in foot-pounds or inch-pounds, the tension being applied to the material being tested.

Yet another object of the invention is the provision of a new and improved tensiometer of such simplified construction that the possibility of lost motion or friction in the indicating means due to wear or maladjustment is almost entirely eliminated.

These and other objects of the invention will become apparent from the following description and accompanying drawings in which, Fig. 1 is a top plan view partly in section of my improved tensiometer.

Fig. 2 is a fragmentary perspective view of the operating lever arm, indicating arm and indicating scale.

Fig. 3 is a sectional view taken on the line 3—3 of Fig. 1.

Fig. 4 is a top plan view of a modified form of tensiometer constructed in accordance with my invention.

Fig. 5 is a side elevational view of the tensiometer shown in Fig. 4.

Fig. 6 is a cross-sectional view taken on the line 6—6 of Fig. 4.

Fig. 7 is a top plan view of still another embodiment of my invention.

Referring to the drawings I have shown in Figs. 1 to 3 a form of the invention which is preferred where sturdiness of construction is the prime consideration. The tool therein shown comprises a pair of lever arms indicated generally at 10 and 11 provided with relatively short jaws 12 and 13 and relatively long handles or operating arms 14 and 15 which terminate in hand grips 16 secured to the ends of the operating arms in any suitable manner, for example by means of rivets 17 shown in Fig. 1. Intermediate the jaws and the operating arms or handles the lever arms 10 and 11 are provided with flat interengaging knuckles 18 and 19 respectively by means of which the two lever arms are pivotally secured together upon a pin 20, in such fashion that upon moving the operating arms 14 and 15 in a closing direction from the position shown in Fig. 1 the jaws 12 and 13 are pivoted outwardly in an opening direction.

Operating arm 15 is in the form of a relatively rigid elongated arm of rectangular cross section, but operating arm 14 is provided with a handle bar 21 of flexible spring tempered metal extending from the hinge knuckle 18 and having its opposite end secured to a hand grip 16. Normally extending parallel to the handle bar 21 is an indicating bar 22, integral with the handle bar 21 at the knuckle portion 18 where the lever arms 10 and 11 are pivoted together. The outer end of the bar 22 is not secured and is provided with a pointer 23 for indicating on a scale 24 secured to the hand grip 16 of the instrument in any suitable manner. Scale 24 may be provided with a channel 25 in which a telltale 26 is free to slide for indicating the greatest extent of movement.

Each of the jaws 12 and 13 is provided with means for clamping an end of a strip of fabric or thread comprising a resilient clip 27 secured at its rear end to the side of the jaw and having a forward gripping edge 28 normally positioned out of engagement with the side of the jaw. To force the gripping edge 28 of a clip against the side of a jaw so that it will grip the end of a strip of textile fabric or an individual thread or strand the clip is provided with a beveled cam surface 29 adapted to engage with a second cam 30 complementary to the cam 29 and pivoted on a pin 31 coaxial with the axis of the cam surface 29.

It will be apparent that in one position of the pivoted cams 30 the beveled faces on the cams 30 and surfaces 29 complement each other and clips 27 remain disengaged from the sides of the jaws 12 and 13 but in a position 180° removed from the first mentioned position the beveled surfaces will be opposed and the gripping edges 28 of the clips will be forced firmly into engagement with the sides of the jaws.

In using this instrument for testing the tensile strength of fabric a strip of the same is first clamped to the jaws 12 and 13 so that it is taut but not under tension. This will be indicated when the pointer 23 is at zero as shown in Fig. 1. The instrument is then grasped by the hand grips 16 and a force applied to the operating arms 14 and 15 tending to move them toward each other so that the jaws 12 and 13 tend to spread and a tension is applied to the piece of fabric. Due to its resilience the handle bar 21 will tend to bend or flex when the fabric resists the opening of the jaws, but the indicating arm 22 being free on its outer end this end will remain stationary so that as the handle bar 21 flexes the scale 24 is moved under the indicator 23. Scale 24 may be calibrated in foot-pounds or inch-pounds or in any other suitable indicia in which tension is to be measured so that the instrument is direct reading.

Embodiments of the invention for taking more accurate measurements of the tensile strength of fabric or individual threads are shown in Figs. 4 to 7. It will be noted that these instruments are generally similar in construction to the instrument shown in Figs. 1 to 3 but they include an operating lever arm 32 of different construction and a dial indicator 33 in place of the scale 24. Operating lever arm 32 comprises a resilient handle bar 34 extending from hinge knuckle 18 and secured at its lower end to a sleeve-like hand grip 35 by means of set screws 41, and an indicating bar 36 which extends from the knuckle 18 into the sleeve 35 but is not secured to the latter. As a result when the handle bar 34 is flexed the bar 36 will move in the sleeve 35 longitudinally with respect to the bar 34. By means of an operative connection of conventional construction between an indicator needle 37 in the dial indicator 33 and this bar 36 the needle 37 will be actuated when the handle bar 34 of the lever arm 32 is flexed. By properly calibrating the dial of the dial indicator it may be made to indicate directly the amount of tension applied to a material being tested. A suitable operative connection between the dial indicator 33 and the indicating arm 36 is disclosed and described in United States Patent No. 2,196,223 for a Torque Indicating Wrench, issued April 9, 1940, to Walter H. Montgomery.

Another embodiment of the invention similar to that just described is shown in Fig. 7 but with the dial indicator 33 mounted at the hub or pivot point of the lever arms. In this form of the invention a handle bar 38 and an indicator bar 39 are both rigidly secured at their outer ends in a hand grip 40 and the inner end of the handle bar 38 is integral with a hinge knuckle on the arm 10 by which the lever arms 10 and 11 are pivotally secured together similar to the manner in which the arms of the embodiments previously described are secured together. The inner end of the bar 39 projects into a slot 40 in the hinge knuckle on the lever arm 10 and is free to move longitudinally therein when the handle bar 38 is flexed. Bar 39 is provided with a finger 39' for cooperation with a pin 73' operatively connected to an indicator needle 37 in the dial indicator 33 which is calibrated to indicate the tension applied to a material being tested. This connection may be similar to the connection used in the tool shown in Figs. 4 and 5. In both of these embodiments of the invention clips 27 similar to the clips shown in Fig. 1 may be used for clamping fabric to the jaws 12 and 13 of the instrument and these instruments are used in the same manner as the device first described.

It will be obvious that instruments for testing materials of widely varying tensile strength may be constructed by providing a handle bar of varying degrees of resistance to flexing. Other changes in the size, form or arrangement of parts falling within the scope of the invention may also be made. Therefore, I do not wish to be limited to the precise construction shown and described, but desire to avail myself of all the modifications and changes coming within the scope of the appended claims.

I claim:

1. A device for testing the tensile strength of fabric or individual threads and strands comprising rigid and flexible lever arms having interengaging hinge knuckles formed intermediate their ends for pivotally securing said levers together to form relatively long operating handles and relatively short jaws, said jaws having flat, normally contacting inner faces, means for tautly clamping a material to be tested to said jaws to resist opening thereof when force is applied to said handles, an indicating bar integral with the knuckle on said flexible arm and extending parallel to the unflexed position of said arm, a scale secured to the outer end of said flexible arm, a pointer on said bar for cooperating with said scale and indicating the deflection of said flexible arm when force is applied thereto for measuring the tension applied to the material being tested, and a telltale cooperating with said pointer and scale to indicate the point of greatest deflection.

2. A device for testing the tensile strength of fabrics or individual threads and strands comprising rigid and flexible lever arms pivotally secured together intermediate their ends to form relatively long operating handles and relatively short jaws, means for tautly clamping a material to be tested to said jaws to resist opening thereof when force is applied to said handles, said flexible arm provided with a slot adjacent the pivoted portion thereof, an indicating bar on said flexible arm having a free end extending into said slot, said bar being adapted to move longitudinally in said slot with respect to said arm, an indicator secured at the pivot axis of said device and means operatively connecting said bar and indicator to indicate the relative longitudinal displacement of said bar with respect to said arm upon the application of force to said handles, said indicator being calibrated to measure the tension applied to the material being tested.

3. A device for testing the tensile strength of fabric or individual threads and strands, comprising rigid and flexible lever arms having interengaging hinge knuckles formed intermediate their ends for pivotally securing said levers together to form relatively long operating handles and relatively short jaws, said jaws having flat, normally contacting inner faces, means for tautly clamping a material to be tested to said jaws to resist opening thereof when force is applied to said handles, an indicating bar integral with the knuckle of said flexible arm, said indicating bar being located in the plane of said levers and parallel with said flexible arm, and a scale and pointer mounted on said flexible arm and bar for indicating the deflection of the flexible arm when force is applied thereto for measuring the tension applied to the material being tested.

4. A device for testing the tensile strength of fabric or individual threads and strands, comprising rigid and flexible lever arms having interengaging hinge knuckles formed intermediate their ends for pivotally securing said levers together to form relatively long operating handles and relatively short jaws, said jaws having flat, normally contacting inner faces, means for tautly clamping a material to be tested to said jaws to resist opening thereof when force is applied to said handles, an indicating bar integral with the knuckle of said flexible arm, said indicating bar being located in the plane of said levers and parallel with said flexible arm, a cooperating scale and pointer mounted on said flexible arm and bar for indicating the deflection of the flexible arm when force is applied thereto for measuring the tension applied to the material being tested, and a telltale slidably mounted on the scale in the path of the pointer for indicating the point of greatest deflection.

5. A device for testing the tensile strength of fabric or individual threads and strands, comprising rigid and flexible lever arms having interengaging hinge knuckles formed intermediate their ends for pivotally securing said levers together to form relatively long operating handles and relatively short jaws, said jaws having flat, normally contacting inner faces, means for tautly clamping a material to be tested to said jaws to resist opening thereof when force is applied to said handles, an indicating bar integral with the knuckle of said flexible arm, said indicating bar being located in the plane of said levers and parallel with said flexible arm, and an indicator adapted to be operated by relative movement between the flexible arm and the indicating bar.

FRANK M. STEADMAN.

REFERENCES CITED

The following references are of record in the file of this patent:

UNITED STATES PATENTS

| Number | Name | Date |
| --- | --- | --- |
| 280,491 | MacKay et al. | July 3, 1883 |
| 2,136,344 | Kochheiser et al. | Nov. 8, 1938 |
| 2,196,223 | Montgomery | Apr. 9, 1940 |
| 2,348,098 | Storrie | May 2, 1944 |
| 2,368,757 | Graham | Feb. 6, 1945 |

FOREIGN PATENTS

| Number | Country | Date |
| --- | --- | --- |
| 13,650 | Great Britain | 1894 |
| 142,515 | Austria | Aug. 10, 1935 |